US008095467B2

(12) United States Patent
Bettinger

(10) Patent No.: US 8,095,467 B2
(45) Date of Patent: Jan. 10, 2012

(54) INTERNET NEWS COMPENSATION SYSTEM

(76) Inventor: David S. Bettinger, Grosse Ile, MI (US)

( * ) Notice: Subject to any disclaimer, the term of this patent is extended or adjusted under 35 U.S.C. 154(b) by 1787 days.

(21) Appl. No.: 10/967,560

(22) Filed: Oct. 18, 2004

(65) Prior Publication Data

US 2005/0049971 A1 Mar. 3, 2005

Related U.S. Application Data

(63) Continuation-in-part of application No. 09/504,657, filed on Feb. 14, 2000, now abandoned.

(51) Int. Cl.
*G06Q 99/00* (2006.01)
(52) U.S. Cl. .......................................................... 705/52
(58) Field of Classification Search ...................... 705/51
See application file for complete search history.

(56) References Cited

U.S. PATENT DOCUMENTS

| | | | | |
|---|---|---|---|---|
| 4,827,508 A | * | 5/1989 | Shear | 705/53 |
| 5,339,239 A | | 8/1994 | Manabe et al. | |
| 5,557,721 A | | 9/1996 | Fite et al. | |
| 5,684,963 A | | 11/1997 | Clement | |
| 5,740,549 A | | 4/1998 | Reilly et al. | |
| 5,754,830 A | * | 5/1998 | Butts et al. | 719/311 |
| 5,761,662 A | | 6/1998 | Dasan | |
| 5,768,521 A | | 6/1998 | Dedrick | |
| 5,867,494 A | | 2/1999 | Krishnaswamy et al. | |
| 5,892,900 A | * | 4/1999 | Ginter et al. | 726/26 |
| 5,973,683 A | | 10/1999 | Cragun et al. | |
| 6,006,197 A | | 12/1999 | d'Eon et al. | |
| 6,012,071 A | | 1/2000 | Krishna et al. | |
| 6,016,509 A | | 1/2000 | Dedrick | |
| 6,173,286 B1 | | 1/2001 | Guttman et al. | |
| 6,216,112 B1 | | 4/2001 | Fuller et al. | |
| 6,219,680 B1 | | 4/2001 | Bernardo et al. | |
| 6,269,361 B1 | | 7/2001 | Davis et al. | |
| 6,314,573 B1 | | 11/2001 | Gordon et al. | |
| 6,353,929 B1 | | 3/2002 | Houston | |
| 6,397,189 B1 | | 5/2002 | Martin et al. | |
| 6,536,037 B1 | | 3/2003 | Guheen et al. | |
| 6,738,155 B1 | | 5/2004 | Rosenlund et al. | |
| 6,807,558 B1 | | 10/2004 | Hassett et al. | |
| 6,907,566 B1 | | 6/2005 | McElfresh et al. | |
| 7,039,599 B2 | | 5/2006 | Merriman et al. | |
| 7,047,302 B1 | | 5/2006 | Chatani et al. | |

(Continued)

FOREIGN PATENT DOCUMENTS

JP 2002027799 1/2002

OTHER PUBLICATIONS

Derwent Acc No. 2002-162301, Kim J.G. Jul. 2001.

(Continued)

*Primary Examiner* — Jamie Kucab
*Assistant Examiner* — Jacob C. Coppola
(74) *Attorney, Agent, or Firm* — Christopher Paul Mitchell

(57) ABSTRACT

A computerized compensation system of disseminating a plurality of news and information items offered, contributed, and submitted by a plurality of independent submitters to an internet provider site. The provider site accepts, indexes, catalogs, tracks, meters, and calculates viewer exposure to each submitted news and information item chosen by a plurality of viewers. Compensation due individual submitters is transmitted in real time, as the submitter continues the submission to the provider web site. Billing of funding sources is provided.

17 Claims, 5 Drawing Sheets

U.S. PATENT DOCUMENTS

| | | |
|---|---|---|
| 7,089,194 B1 | 8/2006 | Berstis et al. |
| 7,493,553 B1 | 2/2009 | Vora et al. |

OTHER PUBLICATIONS

"New Metrics for New Media: Toward the development of Web Measurement Standards", Thomas P Novak and Donna L. Hoffman, Project 2000 White Paper, Sep. 26, 1996.

Office Action issued in U.S. Appl. No. 09/504,657 mailed Oct. 11, 2001.

Office Action issued in U.S. Appl. No. 09/504,657 mailed Mar. 22, 2002.

Advisory Action issued in U.S. Appl. No. 09/504,657 mailed Jul. 3, 2002.

Notice of Allowance/Notice of Allowability issued in U.S. Appl. No. 09/504,657 mailed Jun. 19, 2003.

Communication application withdrawn from issue in U.S. Appl. No. 09/504,657 mailed Aug. 27, 2003.

Office Action issued in U.S. Appl. No. 09/504,657 mailed Oct. 21, 2003.

Office Action issued in U.S. Appl. No. 09/504,657 mailed Apr. 20, 2004.

Interview Summary issued in U.S. Appl. No. 09/504,657 for interview of Oct. 7, 2003.

Notice of Abandonment issued in U.S. Appl. No. 09/504,657 mailed Nov. 24, 2004.

Office Action issued in U.S. Appl. No. 12/500,349 mailed Jul. 9, 2010.

Interview Summary issued in U.S. Appl. No. 12/500,349 for interview of Oct. 27, 2010.

Office Action issued in U.S. Appl. No. 12/500,349 mailed Jan. 18, 2011.

Interview Summary issued in U.S. Appl. No. 12/500,349 for interview of Dec. 22, 2010.

* cited by examiner

| FUNDING SOURCE PREFERENCES | | |
|---|---|---|
| Funding Source: XYZ Windows, Inc. | | |
| Preference Category | Group | Price Value per Viewer ** |
| Subject | Fire | $0.12 |
| | Accident | $0.14 |
| | Crime | $0.23 |
| | Home Invasion | $0.40 |
| Coverage | Local | $0.11 |
| | State | $0.09 |
| | National | $0.08 |
| Time of Day | Morning | $0.03 |
| | Afternoon | $0.02 |
| | Prime Time | $0.07 |
| Layout | Banner | $0.07 |
| | Sidebar | $0.09 |
| | Marquee | $0.05 |
| Response | Click Through** | $0.75 |
| | Address Capture** | $0.55 |

Funding Source Media Item

FIG. 7.

| Submitter | Axxx J. Pxxxxxx* | | | |
|---|---|---|---|---|
| Exposition Index No. | 12,175 | | Date | 19-Sep-06 |
| Submitter Web Address | AJP12457x@bol.com* | | GPS: | 33.00.02:96.59.47* |
| Submitter Credit Card # | 404X4-4884-2992* | | | |
| Time Lead Approved | 07:12:35 | | | |
| Current Time | 08:17:14 | LIVE ! | | |
| Funding Source | XYZ Windows, Inc. | | | |
| Preference Catagory | Group | Group Price Value | Metered Viewers | Funding Source Expense |
| Subject | Fire* | $0.12 | 3747 | $449.64 |
| Coverage | Dallas Local* | $0.11 | 3747 | $412.17 |
| Time of day | Morning | $0.03 | 3747 | $112.41 |
| Layout | Banner | $0.07 | 3747 | $262.29 |
| Current Funding Source Expense | | | | $1,236.51 |
| Current Provider Value Added | | | | $618.26 |
| Current Submitter Compensation | | | | $618.26 |

FIG. 8.

| CURRENT FUNDING SOURCE STATEMENT | | | | |
|---|---|---|---|---|
| Current Date: | 19-Sep-06 | | | |
| Current Time: | 08:17:14 | am | | |
| FUNDING SOURCE: XYZ Windows, Inc. | | | | |
| Exposition Index No. | 12,175 | 12,124 | 11,832 | 11,854 |
| Date | 19-Sep-06 | 19-Sep-06 | 18-Sep-06 | 18-Sep-06 |
| Subject > | Fire | Accident | Robbery | Election |
| Subject Price Value | $0.12 | $0.14 | $0.23 | $0.17 |
| Group > | Local | Local | Local | National |
| Group Price Value | $0.11 | $0.11 | $0.11 | $0.08 |
| Time of Day > | Morning | Morning | Afternoon | Prime Time |
| Time Price Value | $0.03 | $0.03 | $0.02 | $0.07 |
| Layout > | Banner | Sidebar | Banner | Marquee |
| Layout Price Value | $0.07 | $0.09 | $0.07 | $0.05 |
| Metered Viewer Count> | 3747 | 2168 | 4794 | 1690 |
| | LIVE ! | LIVE ! | -Total- | -Total- |
| Expense | $1,236.51 | $802.16 | $2,061.42 | $760.50 |
| CURRENT TOTAL FUNDING SOURCE EXPENSE | | | | $4,860.59 |

INTERNET NEWS COMPENSATION SYSTEM

CROSS-REFERENCE TO RELATED APPLICATIONS

This application is a continuation-in-part of U.S. patent application Ser. No. 09/504,657, filed Feb. 14, 2000, now abandoned.

Cross referenced to application article number 2 179 627 347 received at PTO mail center on Feb. 9, 2000.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

The present invention is directed to operations in which a charge for e-commerce services is automatically and continuously determined and utilized for automated job performance and real time accounting for the metering, calculation, and compensation of service time charges on internet servers for voluntarily offered contributions of news and information. A real time transaction output to contributors is a feature of the present invention. Such cost systems apply to automatic internet connected news and information sites and a variety of viewer interest sites.

BRIEF SUMMARY OF THE INVENTION

The present invention is, briefly stated, an internet news compensation and cost system comprising at least one customized news repository server connected to the internet and accessed by a plurality of individual web terminals for viewing news, information, advertising, and background in various media including text, voice, plural static images, streaming banners, 3-D images, animation, audio, continuous video and video packets whereby viewer interest is involved in the determination of reporter compensation for a submitted and contributed news or information item and exposition.

Embodiments of the present invention create an interactive feedback environment that communicates the financial benefit to a submitter of the exposure accrued to an exposition in real time during the exposition process.

PRIOR ART

The display of news is common on the internet, as is the display of news and information to special interest groups. Internet web providers and host sites are common on the World Wide Web, hereafter referred to as the web or net. These sites display information and content that attracts viewers. A provider may self-fund a site but many advertisers pay the site provider that offers space for ads interspersed with provider content that is being displayed. It is common because of convenience for news publishers, whether on the web or other media, to rely on news consolidators for the collection and prioritization of news. For example, a small town newspaper's site may display national news from a wire service such as Associated Press, a news consolidator.

In the prior art of news publishing, the payment for a news item to an individual reporter was a matter of arbitrary judgement on the part of the publisher. In general, the structure of news media organizations has been a top down management and compensation structure. Salaried reporters are not on average well paid. Independent reporters such as paparazzi have been relegated to shadowing celebrities. An on-the-scene reporter who submits a report to a news wire service may find that report used by a network anchor earning far more than the reporter.

The web communicates breaking news stories in still, audio and video media. It can be argued that the depth and variety of web news as well as other news media has been narrowed by media company consolidations.

In the prior art of TV news programs, viewer surveys have been used as the basis for advertising time charges. Such surveys are not workable for judging the comparative value between breaking news stories for reporter compensation.

In the prior art on web commerce, advertisers have compensated a provider site based on the number of viewer visits to a site whether or not an advertisement was actually viewed. Also in the prior art of web commerce, advertisers have compensated a provider based on the number of referrals that routed the viewer to the advertiser's site from an ad banner. Duration of view has been addressed by some provider sites by stalling the download of requested data to the viewer so as to hold the viewer's attention for an advertiser. It may be inferred that this covert technique may elicit a premium from the advertiser for the site. Such tactics indicate the need for an improved cost system that ties ad revenue more closely to an adjacent item of viewer interest.

In the prior art of TV programs, videotapes are submitted and reported to a program such as "World's Funniest Videos." Program personnel manually view all submissions and present the best for ranking by a studio audience in a prize competition. Such a process includes a plurality of reporters and compensation from a provider based on viewer ranking. But the process is too cumbersome for the timely presentation and compensation of live, breaking news, and offers no incentive for in-depth reporting.

In the prior art of television news, an auto accident item might be followed by an advertisement for the specific car involved. The business is not rule-based between news subject and product advertisement placement preferences.

In the prior art of e-commerce, numerous costing and pricing methods are known for pricing stock items including stock videotapes and clips. Such price competition is unsuitable for the unique and transitory items such as news and live, original reports.

Ginter, in U.S. Pat. No. 5,892,900, discloses an e-commerce system for validating documents by providing a distributed virtual distribution environment (VDE) that may enforce a secure chain of handling and control of electronically stored or disseminated information. Ginter relates to validated use of data documents, not live multi-casts. Ginter describes a fee for view received by the data provider that may or may not be shared with authors. Ginter's metering is better termed monitoring since no calculation of compensation is offered.

Shear, in U.S. Pat. No. 4,827,508, describes a database usage metering and protection system and method. Shear describes an annual fee as a pay-for-view for inert data documents. Shear provides no way of receiving new material from an author. Shear provides no method of compensating an author. Shear compensates only the publisher and the database supplier. Shear charges are based on monthly, annual, and usage which was the normal method of business transaction prior to Shear.

Reilly, et al., in U.S. Pat. No. 5,740,549, has disclosed an information and advertising distribution system and method that concerns recorded documents and recorded advertisements. Reilly delays the display of downloaded data, does not meter, and has no calculation mechanism.

Fuller, in U.S. Pat. No. 6,216,112, describes a software program that is downloaded by a single viewer for tracking the exposure of an embedded advertisement for advertiser billing when the program is run. Fuller tracks, meters, and bills but not for the document or data, much less a multi media exposition. Fuller provides compensation of the tracking software programmer(s) by advertisers based on usage after a variable delayed upload.

Dasan, in U.S. Pat. No. 5,761,662, discloses a personalized newspaper. Since a multitude of reporters is represented in a single download, no individual reporter can be singled out. Dasan ignores cost or compensation.

Cragen, in U.S. Pat. No. 5,973,683, describes a television download of multiple film ratings to censor viewer choice. The viewer pays-per-view for this recorded service. No compensation tracking, metering, calculation, or compensation concerns the author.

Krishnaswamy, et al., in U.S. Pat. No. 5,867,494 describes a method of integrated video conferencing over the internet that includes billing for the calls to the participants. No compensation is made for the contributions of the participants.

DETAILED DESCRIPTION OF THE INVENTION

PROVIDER SITE: The specification describes an internet news compensation system that is comprised of a provider site, a plurality of independent submitter web terminals, a plurality of viewer web terminals, funding source web terminals, associated site web terminals, and background data web terminals. The provider site comprises four components, a submitter web server, a viewer web server, a metering mechanism, and a layout web server.

The submitter web server is selected for accepting and indexing a plurality of multi-media expositions from a plurality of independent submitter web terminals selected for voluntary submission and continuous updating of the multi-media expositions by a plurality of independent submitters.

The selection of server hardware and data processing software for the provider site system is made from a wide range of off-the-shelf products supplied by leading companies including IBM, HP, Apple, Oracle, SAP, Microsoft, and others. In operation the selected hardware and software in these internet server sites operate three tier systems as intercessors between submitters and client viewers, handling multi-media expositions as objects, brokering objects between servers, using parallel processing for simultaneous presentation and internet hosting of multiple expositions, automatically updating multiple files, and dealing seamlessly with multiple data protocols. Further the modems, cables, ISPs, and internet system structure that are selected from these suppliers are readily available for continuously updated, electronic communication between sites, servers, and terminals in real time.

The multi-media expositions are routed to a viewer web server selected for displaying the multi-media expositions on a provider site to a plurality of free agent viewers utilizing a plurality of viewer web terminals.

A metering mechanism comprises means to track, meter, and calculate using computer hardware and software. For the purposes of the embodiments of the current invention the means to track a multi-media exposition as an object is the exposition index number or numerical designator that is assigned to each individual exposition by the submitter web server. The exposition index number may be a data item inherent in a lead or a unique number sequentially assigned by the software. An example of a unique number for tracking is shown in FIG. 7. The data processing means to support tracking resides in the product offerings of the aforementioned companies. Such an object broker software program is selected for tracking each multi-media exposition chosen by the free agent viewers for display.

This tracking program is coupled with means such as an accounting routine, algorithm, or program selected for calculating compensation accruing to each independent submitter based on at least one selected viewer exposure measure accruing to each of the submitted multi-media expositions. The means for calculating the compensation for a submitter is at least one price value of a viewer exposure measure (PV) and at least one viewer count of the exposure of that viewer exposure measure due to the tracking of the exposition (C) multiplied together (PV×C) times the portion of this site provider gross income to be paid in compensation to the submitter (%). The compensation for a single viewer exposure measure and a single metered count of viewer exposure would equal Compensation=(%)×(PV×C). If more than one exposure measure applies to an exposition, then the calculation means includes the addition and sum of the multiplied amounts resulting in the following calculation for example $$\text{Compensation}=(\%)\times[(PV_1\times C_1)+(PV_2\times C_2)+(PV_3\times C_3)+\text{etc}].$$

The addition of the multiplied subtotals of each price value times each count for that viewer exposure measure is shown in FIG. 7 and discussed in the description of that figure. The accounting program coupled with means within the accounting routine, algorithm, or program is selected for continuously updating the accrued compensation and communicating the updated accrued compensation to each submitter web terminal using the submitter web server. The means for updating the previous calculation is inherent in the calculation since the metered count for each viewer exposure measure is cumulative.

Further, the submitter web server, the plurality of submitter web terminals, the viewer web server, and the metering mechanism are all in continuous real time electronic communication among each other. The result of this real time communication is that the compensation due each submitter is continuously communicated in real time to the submitter web terminal during the continuous communication of the multi-media exposition by the submitter web terminal. For example under current technology a camera-equipped cell-phone can be used by a submitter as a submitter web terminal to send a series of still pictures and a running monologue of an exposition. By switching the cell-phone display to text messaging the submitter can view the accumulated compensation earned by the submitter to this point in the exposition. Thus the submitter has an opportunity to judge the worth of continuing an exposition. Specifically, this principle of submitter control is illustrated in the breaking news embodiment.

MEASURES: The metering mechanism calculates compensation based upon one or more viewer exposure measures. The surest measure of audience interest in a multicast is the number of viewers that select a web site. Each one of these viewers after the teaching of the embodiments of the current invention triggers a counter within the metering system of the server. This metering counts each new viewer as the elemental measure of viewer participation. Such viewer counts are usually referred to as "hits" upon a web site. There are a variety of other measures for awarding compensation to a submitter.

These viewer exposure measures are chosen from the measure of the number of viewers, the measure of the duration of view of and by free agent viewer, the measure of free agent viewer response, the measure of free agent viewer click through to a linked site, and all possible measure combinations thereof. The number of viewers is the cumulative metering count. The duration of view by a viewer of a multi-media exposition can be measured because the loss of a viewer results in the cessation of requests for multi-media packets. For example a condition for continuing provider site download to a viewer may be that the viewer must periodically strike the space bar of the viewer web terminal. Thus the beginning time of the download subtracted from either the current time or the time the provider site first omitted a periodic request signal represents the duration of view. Free agent viewer response is the number of responses to an on-screen request or offering. For example, the site provider may offer a free premium or gift related to the exposition to elicit responses from viewers. Click-through to a linked site is a standard internet measure. For example, an advertiser will pay a site provider for hosting an advertisement and then pay an additional fee for viewers that click-through to the advertisers home site where the product may be ordered directly. Specifically, viewer measures are depicted by the instruction embodiment. Viewer measures are illustrated in FIG. 6 and explained in the detailed description of FIG. 6. The criteria for choice among the measures is based upon the ability of the chosen software resident in the metering mechanism to meter a particular measure and the inclusion of that measure in the preference list of the funding source.

PROMOTION: With the enormous volume of material available on the internet it would be impossible for a single exposition to gain any sizeable audience on its own within a short period of time without promotion. The embodiments of the current invention use associated sites to promote expositions. Associated sites are internet sites that are likely to have the same viewer audience as may be associated with the characteristics of the exposition. Thus the web server is further selected for real time communication with associated internet sites of viewing availability of at least one of the multi-media expositions. The relationship of associated site suppliers to the site provider is shown in FIG. 1 and detailed in the description of that figure. An example of an associated site is described in the first scheduled embodiment concerning an exercise instructor. The process of promotion is illustrated in the technical symposium embodiment.

LEAD: Not all submitters may have an exposition that fits the audience of a provider site. Thus there is a need for a collection of data to provide support for acceptance by either a software or human gatekeeper at the provider site. Thus the submitter web server is further selected for accepting and indexing each multi-media exposition based upon a lead of each multi-media exposition. Specifically, the lead is illustrated in the breaking news embodiment and the instruction embodiment. The examples of the elements of a lead are shown in FIG. 7 and detailed in the description of that figure. The relationship to other components of the current invention are shown and described in FIGS. 2 and 3.

LAYOUT WEB SERVER: Compensation indicates a minimum need for the site provider to recover expenses. This implies that expense recovery can be gained from some element of society that would seek to have a message attached to an exposition. A web server is needed that can receive, accept, record, index, layout, and transmit these messages and funding source media. Thus the provider site further comprises the addition of a layout web server selected for accepting and indexing a plurality of funding source media items from a plurality of funding source web terminals. Specifically, the layout web server is discussed in the instruction embodiment. Elements of the layout web server are shown in FIG. 7 and detailed in the description of that figure. The relationship of the layout web server to other components of the embodiments of the current invention are shown in FIGS. 4 and 5 and described in the detailed description of those figures.

ARCHIVE: To ensure a chronicle for business purposes the indexed multi-media expositions must be recorded, saved, and stored in an archive. The storage volume required to store all expositions is considerable and a filter may be used to limit the degree or selection of exposition storage. This storage of a multitude of previously indexed digital multi-media is best accomplished by a database software that treats each exposition as an discrete object for internal program sequencing and retrieval. Since the indexing of multimedia expositions takes place by the submitter web server and the layout web server must manipulate the exposition in order to layout the final product for the viewer, then it follows that the logical place for this archive to reside is in the layout web server. Thus the layout web server is further selected for accepting and recording multi-media expositions in an archive. This is illustrated in FIG. 3 and explained in the detailed description of FIG. 3. Specifically, the archive and its use are illustrated in the instruction embodiment.

LEAD CATALOG: The internet offers a entire universe of choice which makes it difficult for a viewer to choose one exposition from many even on the same provider site. A catalog of the expositions that are currently live and available on the provider site is a necessity. Thus the submitter web server is further selected to identify, interpret, sort, rank, and segregate the individual multi-media expositions into groups within a catalog, based upon preselected criteria applied to the lead. An example of preselected criteria may be similarity of subject. Further, the viewer web server is selected for displaying the multi-media exposition groups and the multi-media exposition catalog on an internet site to a plurality of free agent viewers. This is illustrated in FIGS. 2 and 3 and explained in the detailed descriptions of FIGS. 2 and 3. Specifically, the catalog and its use are illustrated in the literary and performance embodiments. The formation of a catalog includes the automatic accumulation and storage of past viewer preferences in order to prioritize breaking news items. The lead for a news item may be received in the form of audio voice requiring computer voice recognition and language translation in order to register the news item to the correct catalog group.

BACKGROUND DATA: When dealing with breaking news that may affect large segments of society, the perspective provided by background information is a necessity. For example, the community warning embodiment can be made more meaningful to those concerned for the safety of others by the display of a map showing the location of a dangerous situation downloaded from a site that supplies maps such as www.mapquest.com. Thus the layout web server is further selected for retrieving, accepting and indexing a plurality of background media items from a plurality of web servers and terminals. Embedded links to background-data sites that are provided either automatically or based on viewer selection are common in the industry. This is illustrated in FIG. 3 and explained in the detailed description of FIG. 3. Specifically, background data, source, and use are illustrated in the breaking news embodiment.

PREFERENCE LIST: Funding sources such as advertisers have no way of predicting the exact placement of their media, just as site providers are faced with a new mix of expositions each day. However, the funding sources do develop guidelines or preferences for the use of their media. This guidance to the site provider is provided to the layout web server. The site provider hosts the layout web server to receive these preference lists from the funding source web terminals. Thus the layout web server is further selected for accepting and indexing each funding source media item based upon a preference list of each funding source media item. Specifically, preference lists are illustrated by the breaking news embodiment and the literary embodiment. However, preference lists are well detailed in FIG. 6 and explained in the detailed description of FIG. 6.

CATALOG USED FOR LAYOUT: The best advertising uses the juxtaposition of advertisements with associated subjects or media to reinforce the advertiser's desired message. This rule is also true for all forms of message promulgation by funding sources whether for profit or not. Thus the layout web server is further selected to position each funding source media item in close proximity to the multi-media expositions of a related catalog group based upon the preference list of each finding source media item. This is illustrated in FIG. 3 and explained in the detailed description of FIG. 3. Specifically, the use of a catalog for layout by the layout server is illustrated in the exercise embodiment.

PRICE VALUE: Without specific incentives placed upon the site provider the funding source has little or no restrains on the use of the funding source media. By placing a price value on each item on the preference list the funding source provide an incentive to the site provider to use the funding source media in the most profitable manner. Thus the preference list further comprises price value of each preference item. Price value and its use is well illustrated in FIG. 6 and explained in the detailed description of FIG. 6. Specifically, price value is illustrated in the instruction and literary embodiments.

BILLING CALCULATION: The financial base for all embodiments and business models of the current invention is the finding source. The funding source provides the monetary support to pay the site provider based upon a continuing agreement with the site provider. The funding source may be an individual, product advertiser, industrial firm, institution, governmental department or an agency of one of the aforementioned entities. The finding source may, in some cases, also be the site provider.

Continuing agreements between funding sources and site providers are typical in the internet industry. For example, in current practice an advertiser will pay a site provider based on the count of the number of viewers to a particular web page where the advertiser's advertisement is displayed on the same web page with exposition material that is the primary attraction of the viewer. The price value of each viewer is dependent upon the ability of the exposition material to attract a viewer that is compatible and beneficial to the goal of the advertiser. Some of the factors that may affect the ability of the exposition material to attract compatible and beneficial viewers include subject, timeliness, presentation, action portrayal, time of day, and size of advertisement. These factors are also common in current advertising practice. Some agreements between advertisers and site providers also include additional payments to the provider for estimated duration of view. Without periodic response from the viewer the transmission of an exposition ceases providing an end point to the metering of duration. Some agreements between advertisers and site providers include incidental payments to the site provider for each viewer that "clicks through" from the provider page to an advertiser site or responds to a displayed animation, question, or offer. Some agreements between advertisers and site providers include incidental payments for each viewer's email address captured due to a displayed advertisement. Thus it is common in the internet industry for the funding source to pay the site provider based on viewer count times estimated average duration of view times the price value per viewer plus incidental provisions. Thus the following formula represents a simplification of the gross income to the site provider which is also the billable expense to the funding source.

Site Provider Gross Income=Viewer Exposure Measure×Price Value/per Viewer

Thus the means selected to calculate expense accruing to each funding source is further based on at least one selected price value and at least one viewer exposure measure mathematically manipulated within a computer accounting program. The calculation of a funding source bill is illustrated in FIG. 8 and explained in the detailed description of FIG. 8. In addition, the calculation is also illustrated in the breaking news embodiment.

COMPENSATION CALCULATION: It is an outcome from the teaching of the embodiments of the current invention that it is difficult for a site provider to estimate the attraction of viewers to a particular news item before the exposition. The site provider can eliminate this uncertainty by an open offer to all reporters to income share. Thus the compensation to a reporter becomes a percentage of the gross income generated to the site provider for the reporter's individual exposition item.

Reporter Compensation=Provider Gross Income× Provider Pay-out Percentage

Thus the means selected to calculate compensation accruing to each independent submitter is further based upon a portion of the sum of expenses accruing to the funding sources for the exposition of the independent submitter mathematically manipulated within a computer accounting program. Submitter compensation is illustrated in FIG. 7 and explained in the detailed description of FIG. 7. Submitter compensation is illustrated in all the embodiments described below.

UNSCHEDULED: Breaking news knows no schedule. Its chief characteristic and attraction is that it is immediate. The immediacy has a profound impact on the site provider. The embodiments of the current invention teach that the provider site must be prepared for instant acceptance of a worthy exposition from a previously unknown submitter or reporter. Thus beginning of the exposition submission by the submitter is unscheduled by site provider. The process that makes unscheduled responsiveness possible is shown in FIG. 2 and described in the detailed description of FIG. 2. Unscheduled expositions are illustrated in the breaking news and community warning embodiments below.

Unscheduled Example 1

Breaking News Embodiment

In an embodiment of the present invention an internet site provider makes available to the general public a web news site that offers breaking news stories much as a television news magazine. Such a news provider site specializes in fires, accidents, celebrity events, political events, environmental, and weather reports. The reporters that submit breaking news stories to this site are independent agents that have suitable equipment for generation and communication to an internet portal of media such as text, voice, audio, digital photos, drawings, and video. The sole advantage of a reporter may be that no other potential reporter is present at a particular location where news is breaking and the need for a live on-site reporter is urgent to support the public's instant need to know.

For the purposes of the embodiments of the present invention a reporter is the individual that initiates the contact to the provider site and therefore has a vested financial interest in the compensation earned by the exposition. The reporter is the individual that communicates the existence of the potential for the exposition to the site provider and monitors the arrival of the compensation figures to gage either the growth or decline of audience interest for the exposition. The reporter presents a live audio or video report in real time to the web site provider as a continuing exposition of the news event in progress.

For the purposes of the embodiments of the present invention, the term "real time" is defined to mean the apparent continuous communication between two pieces of electronic equipment despite generally invisible delays due to source spooling, packet segmentation, packet sending, transmission queuing, reception storage, reception re-sequencing and other electronic data processes.

For the purposes of the embodiments of the present invention an exposition is a live, original, news item, report, feature, discussion, lesson, instruction, demonstration, review, infomercial, feature, performance, or presentation offered and transmitted to a provider site for compensation. The exposition may or may not involve the submitter as a participant in the exposition. An exposition may be preformed by a single participant or multiple participants just as a sporting event may have multiple reporters participating in the play by play coverage together. The equipment operating expense of a single channel or page to the site provider is minimal. Thus the cessation of the exposition is left to the reporter to judge either that further exposition is profitable or unprofitable based on the cumulative compensation transmitted to the reporter by the site provider.

The viewers are free agents, media consumers, who have selected this site to view the latest breaking news stories. As free agents the selection by viewers of a particular news story and the branching to that news item on the site is made based upon their personal criteria and preferences. The incoming news item may be augmented by the site provider in numerous ways including translation of the reporter's words, use of a virtual synthetic news anchor for introduction, addition of file footage and addition of background information. In the embodiments of the present invention the service site is offered free to viewers because the monetary source is advertisers that pay fees to the provider much as advertisers fund a television news report. Thus the funding source for this embodiment is an advertiser of replacement windows that is billed for both submitter compensation and value added services by the site provider. These value added services comprise administration, hosting, layout, and billing services by the site provider. The funding source media is an advertisement with a picture of a window and the company name. The procedure is that advertisements are submitted to the site provider for view on the provider site and are positioned adjacent to and on the same screen, page, channel, or subsidiary site and page as appropriate breaking news stories. The reporters are compensated for their contributions to the site based on the exposure generated based on measures comprising viewer hits, viewer downloads, viewer duration, viewer responses, time of day, type of media, subject matter, and other measures. The advertisers are charged, in kind, a higher rate to cover both reporter compensation and provider fees based on equivalent viewer measures. Thus the advertisers are the monetary source for this business model. The difference between the compensation to the reporters and the fees paid by the advertisers is gross income for the provider. Thus an equitable and beneficial result is created for all parties due to the attributes of the embodiments of the present invention.

REPORTER SPECIFIC: Thus the submitter comprises a reporter, further the multi-media exposition is an unscheduled news and information report, further site provider comprises a news collection and dissemination agency, further provider site comprises a news and information internet site controlled and operated by the provider, further the lead comprises subject, identity, location, and payment account, further funding source comprises an advertising agency, further the funding source media item comprises an advertisement, further the metering mechanism comprises at least one means chosen from means to measure number of viewers, means selected to determine time of day of news and information report downloaded from the provider site by the viewers and means selected to determine time of day of the duration of view of the news and information report downloaded from the provider site by the viewers, whereby the metering mechanism calculation means selected for utilization of the measurements and determinations to provide for compensation determination for the reporters, wherein the criteria for choice among the means is based upon the ability of the chosen software resident in the metering mechanism to meter a particular measure and the inclusion of that measure in the preference list of the funding source, further whereby the metering mechanism is selected for communication of the compensation to the reporters as the reporters continue submission of the news and information reports.

Unscheduled Example 2

Community Warning Embodiment

In another embodiment a site provider specializes in highway and traffic issues. The site provider provides a large number of simultaneous multicast channels after the teaching of this current invention that display real time highway activity as contributed by individual submitters acting as good citizens to uphold the public good as well as acting as reporters. The funding sources are various groups against drunk drivers, automobile insurance companies, and the State Highway Patrol that also monitors the site. The site is profitable to the provider and a short easy-access code for potential reporters is widely advertised. For example a submitter to this site is a housewife returning from shopping when she observes a driver recklessly enter a busy highway from a drinking establishment. As the reckless driving continues she uses her cellphone to dial the easy-access code to initiate communication with the site provider to report the driver while at the same time becoming an on-site reporter. Her cell phone number is sufficient for identification and the phone automatically furnishes the GPS location. Her cell phone account is sufficient financial account identification and will be credited with any compensation due. Thus, the necessary elements of a lead are automatically established with no human response required from the site provider. The process flow that supports this automatic acceptance is shown in FIG. 2. After the lead is established she receives from the provider site a verbal acceptance message and a tone signal as an indication of approval of her exposition or report multicast. The provider site indexes her report by assigning it a unique index number and enters it in a catalog that is posted to a web page of the provider site. As she begins her exposition commentary, she places the cell phone on the dashboard of her car with the camera facing forward and follows the erratic driver at a safe distance. Thus real-time broadband of the errant driver is initiated for multicast. Many viewers have their internet browsers set to alert them as to the presence of such a situation being multicast from this provider site catalog. Other viewers may limit their alert to only traffic situations in their local area. As the route followed by the reckless driver takes the reporter further from her home, her tendency to discontinue the pursuit is overcome by monetary incentive. The display on the back of the cell phone provides a real-time readout of the monetary result of the number of viewers that have joined the multicast. The number of viewers are continuously tallied and factored into the continuously updated calculation of compensation by the site provider. Soon sufficient cumulative income to her account has been generated to pay for her current purchases. As the reckless driver is apprehended by the Highway Patrol it is in their certain knowledge that the action is warranted by the record of the multicast and a large number of remote witnesses. The housewife feels satisfaction from having prevented a possible accident resulting in the injury or death of an innocent person by the erratic driver and the validation that monetary reward brings.

Numerous other traffic reporters provide expositions to sites for the same or allied providers. The summary of these reports is used for essential driver information. For example the GPS location of a variety of individually reported traffic dangers and tie-ups is filtered and communicated to a driver information and communication system to inform each subscription driver of hazards local to their planned route.

SCHEDULED: Beyond breaking news, most activities of human experience and interest draw a larger audience if scheduled. For the submitter and the site provider a larger audience means a large compensation and income. Thus the teaching of the present invention is that it is efficient and beneficial for the beginning of the exposition submission by the submitter to be scheduled at a day and time mutually preselected by the submitter and the site provider.

Scheduled Example 1

Instruction Embodiment

In a further embodiment of the current invention, a site provider has registered a provider site with a unique domain name that emphasizes that the provider site specializes in the production and presentation of fitness related expositions. The fully computerized provider site is capable of hosting numerous multi-media expositions at the same time. In this embodiment the submitter is an exercise instructor. The exercise instructor desires to use a fitness site to distribute an exposition of a live, teaching demonstration and exercise feature to a multitude of viewers. Previous to the multicast the instructor has contacted the site and the site provider has scheduled a multicast of the exposition at a given time on a specific day of the week for 24 weeks.

As shown in FIG. 2, for example, the provider site is generally automated in terms of its multicast and accounting functions. This automation is an indication that although occupying an important middleman position between the reporter and viewers, the markup upon the original material provided by the submitter is substantially lower than charged by other reporting venues such as television, newspapers, or magazines. These other venues have higher costs of distribution of their information. For example, the income of reporters, editors, and writers for a major news-magazine may be less than ten percent of the publisher's gross income. The same measure applied to the business structure of the current invention will likely find that the reporter's compensation may be approximately one half of the provider's gross income for the reporter's exposition. The effect of this low markup is likely to create a multitude of internet venue sites for many interest groups.

Arrangements for scheduled multicasting facilities are based on the initial contact of the site by the exercise instructor in the form of a lead. This current invention teaches that this initial offer by way of a lead by the submitter and this acceptance by the provider site is a necessary and integral step in the compensation process. The exercise instructor may be requested by the producer site to stipulate in the lead that the material to be multicast is original and free of encumbrances such as trademarks or copyrighted material owned by others and that the material to be broadcast is free from fraudulent content. The general subject or headline of the exposition, commentary, instruction class, or editorial is submitted by the exercise instructor to the provider site. The site provider assigns the exposition a scheduled time. Regular multicasts on a daily or weekly basis may be scheduled. The exercise instructor also communicates to the web site a credit number for deposit of compensation to the instructor's account by the site provider. The teaching of the current invention is that the deposit of actual monetary finds for an exposition can be carried out in real time due to the continuously updated nature of the compensation. Since the exercise instructor terminal is continuously updated, then the continuously updated of a credit account need not be delayed, but may be automatically deposited as well. Other deposit of actual fund arrangements may include deposit at the end of the multicast or at regular periods such as weekly or monthly. It is likely that the site provider would delay actual payment of compensation to the reporter until the site provider had been paid by an advertiser, other monetary supporter, or funding source.

The web site promotes the show by previews and ads on related associated sites as being available at a specific time each day. At the appointed time the instructor initiates the connection to the provider site and begins a number of exercise routines. The funding source has transmitted an advertisement to the layout web server that then combines the advertisement with the exercise exposition. As the instructor begins with a monologue describing the preselected set of routines for the day, a faithful cadre of viewers activates their viewer web terminal monitors and begins to view the multicast on the provider site. This initial viewer group is counted by the metering mechanism and a continuous cumulative sum of earnings is calculated and sent to the receiving monitor at the instructor's initiating web terminal. Since exercise enthusiasts are a substantial and growing segment of the population, many providers of goods and services to this segment are eager to have their wares promulgated to this audience. The communication of an exercise routine requires a substantial portion of the screen for the viewer to enjoy, emulate, and perhaps participate. Since the viewer's screen is somewhat rationed in terms of area available for advertisements, the value for access to this audience is high, and thus the amount charged to the advertisers is high. Correspondingly, the compensation per viewer to the instructor is high. The calculation may include allowance for the number of viewers, the duration of view, the time of day, the value of the media, the scarcity of the screen billboard space, allowance for multiple participants within a single presentation, and multiple sites within a single presentation. Multiple sites involved in a single exposition would present additional coordination efforts for the site provider and may raise the portion of gross income from the funding source retained by the provider.

As the exercise routine continues, other interested but late viewers come onto the site and join the view while others drop out to handle local distractions such as phone calls or instant messaging. Still the continuous and cumulative calculation of the number of hits on the site is used to generate and communicate to the instructor the cumulative earnings of the multicast. This communication of compensation provides an incentive to the instructor to continue the broadcast. If some superior exercise instructor lures away the viewers, the instructor is informed because the accrued compensation displayed by the submitter web terminal has ceased to increase. The instructor then would cease to submit the exposition, thus saving time and effort. On the other hand, a large number of viewers would be reflected in a growing cumulative compensation that would provide an incentive to the instructor to continue with the exposition.

As the exposition continues the layout web server records the exposition and stores it in an archive. This archive is then available for later combination with subsequent expositions from the same instructor and sale as edited exercise video to the mutual profit of both site provider and exercise instructor.

The site provider on behalf of the submitter may offer to viewers an internet e-mail address for responses and questions during the exposition. Further, some viewers may choose to implement a duplex internet connection with the provider site. These duplex connections will include text messages, audio, or real time video from the viewer to the site. In this embodiment of the present invention this duplex video may show the viewer following the exercise routine, or performing the routine with a misunderstanding of the technique to be performed. These duplex videos may be combined into a viewer matrix and sent by the site as feedback to the reporter's monitor for active, real time appraisal of the quality and responsiveness of the viewer audience. Individual viewer errors of performance may be remedied by the instructor. Since not all viewers can be counseled individually within a real time multicast, an incentive is created for early site sign-on by viewers vying for such duplex connections.

Between routines the exercise instructor pauses to ask for questions and responses from the multicast audience. Some responses may be by email, others responses may be made to the provider site and relayed to the instructor. The responses through the site may be more valuable to the instructor. Such direct provider site responses tallied by the metering mechanism may be given a high price value by the finding source. The active participation of the viewers is likely to provide more opportunity to be influenced by the advertising material. Thus viewer response would provide additional income from funding sources and advertisers. With prior arrangement between the site and the instructor, mention may be made of the advertiser's product within the presentation of the reporting feature. For example the exercise instructor may provide a positive mention of a personal heart rate monitor or printed instruction manual. Such a mention might merit an additional preference item and a greater compensation per hit during that segment of the exposition, presentation, or feature as this additional cost is passed on to the advertiser who has agreed to these terms beforehand. It is also possible that the low overhead of the site provider may create an understanding by advertisers that the nominal charges for additional items such as product mentions are reasonable and justifiable based on common published industry price values.

If the exercise instructor is well known, the exposition may be of particular value. If the particular routines or moves by the exercise instructor are known in advance to have particular value, then the provider may charge admission to the multicast. Such a monetary fee charged a viewer assures funding sources that the prospective viewer audience has a high level of commitment. A method of assuring premier viewers may involve the registration of the viewer for direct contact by a funding source. For example a marketer of exercise material or services would benefit from having viewers register to view a special exercise exposition by a nationally respected instructor.

SCHEDULED: Thus the submitter comprises an exercise instructor, further multi-media exposition is a scheduled exercise instruction class, further provider comprises a health and fitness site provider, further provider site comprises a fitness internet site controlled and operated by the health and fitness site provider, further the lead comprises subject, identity, location, and payment account, further the exercise instructor is scheduled to begin the exercise instruction class at a specific date and time based upon an agreement with the health and fitness site provider, further the funding source comprises a manufacturer of exercise equipment, further the funding source media comprises an exercise equipment advertisement, further the metering mechanism comprises at least one means chosen from means to measure number of viewers, means selected to determine time of day of health news and information report downloaded from the provider site by the viewers and means selected to determine time of day of the duration of view of the news and information report downloaded from the provider site by the viewers, whereby the metering mechanism calculation means selected for utilization of the measurements and determinations to provide for compensation determination for the exercise instructor, whereby the criteria for choice of means is based upon the ability of the chosen software resident in the metering mechanism to meter a particular measure and the inclusion of that measure in the preference list of the finding source, further whereby the metering mechanism is selected for communication of the compensation to the exercise instructor during the continuing submission of the exercise instruction class.

Scheduled Example 2

Literary Embodiment

In a still further embodiment of the current invention the submitter is an author that desires to report on the attributes of a new novel published by the author. The author's goal is to generate orders through established bookstores without a publisher. The author has used the internet to access a web page presented by a site provider that features literary subjects. This web page lists the attributes in a submitter and an exposition sought by the site provider. The web site provider has enlisted for funding sources a marketer of cosmetics and a retail chain as finding sources. The author submits a lead and is assigned a favorable day and time. The web site provider displays a web page catalog of the various subjects, times, and authors that are to be featured in the near future on the site to draw viewers. The exposition of the novel draws an audience of over five thousand viewers for the twenty-minute exposition. The preference list of the two funding source is additive since funding source media was shown by both throughout the exposition and book review. Each viewer earns the site provider $0.20. The site provider supplies a web address for questions to be asked of the author by the viewers on the exposition web page. Over five hundred questions are submitted by viewers earning a price value of $2.00 each from the advertiser for this evidence of viewer attention, advertisement exposure, and viewer e-mail address capture. As the exposition nears its end, two hundred viewers click through on the banner advertisement to the cosmetic product web page earning a price value of $0.50 each. The site provider and the author spilt the $2,100. Subsequent to the exposition, orders of the novel from local bookstores exceed the number available from the first printing.

Scheduled Example 3

Technical Symposium

In a still further embodiment of the current invention, four scientists as submitters arrange an exposition in the form of a panel discussion at a specific time on an advanced field of physics. The scientists had prearranged with their professional organization to sponsor the exposition by providing a list of 2,500 e-mail addresses of current and prospective members and other interested parties and companies. The site provider schedules the exposition and uses the list for promotion purposes by sending each of the 2,500 and e-mail announcement. Due to the narrow field the site provider is only able to enlisted two advertisers of laboratory equipment from its database of marketers, and only advertises the exposition on ten other associated sites.

The subject only attracts a few hundred fellow scientist viewers. To keep the multi-media exposition streaming to the viewer web terminals, each of the scientist viewers must strike a key, make a sound, or move the mouse cursor every two minutes or other period selected by the site provider. Beyond that response the scientists all actively participate with e-mail responses and questions that continue for a four-hour exposition. The exposition is ended when the compensation numbers transmitted in real time from the web provider indicate a drop in audience. This two hour technical discussion cost each of the two product advertisers and the professional organization $2,000. One third of the $6,000 gross income to the site provider was earned by the scientist in compensation. The multicast gave excellent exposure for the professional organization that subsequently signed up many new members. The product exposure of four hours to an otherwise unreachable niche market audience for the laboratory equipment marketers only cost each marketer $2,000. The web site provider netted $4,000 for its announcement and web site multicast services.

Scheduled Example 4

Business to Business Exposition

In a still further embodiment of the present invention a manufacturer of electronic components is the site provider, web host, and finding source. The submitters are independent engineers and technicians within an industry that is scattered across multiple locations around the world. These engineers are working with diverse applications of these electronic components beyond the knowledge of the provider. The viewers are other engineers and technicians interested in acquiring application specific news, data, methods, training, and information. In this embodiment the host site is offered free to the viewers without outside advertising because the manufacturer benefits by increased purchases of electronic components and therefore fulfills the roll of funding source. The future sales of the manufacturer's product are likely to increase in proportion to the interest generated within the multicast viewers by each reporter. Thus it is equitable that the site provider compensate each reporter for their contributions to the site based on the exposure generated in terms of number of viewers and other viewer exposure measures. The viewers enjoy the benefit of new technical knowledge that would not be available without the submitter's compensation due to the teaching of this invention. Thus an equitable and beneficial financial result is created for all parties due to the apparent attributes of the present invention that include initialization, metering, calculation, and real time transmission of compensation.

Scheduled Example 5

Performance Embodiment

In a still further scheduled embodiment of the present invention, the site provider is a well-known musician. The provider site has a domain name that reflects a talent search theme. Funding sources are record companies and marketers of musical instruments that advertise on the provider site. Submitters are independent amateur musicians and performers that have written original music unpublished and unperformed elsewhere. Hundreds of musicians are automatically scheduled everyday by the provider site on a first-come first-served basis for premium time slots on multiple hosted channels. The viewers for this embodiment may only sample one packet of streaming exposition before moving to the next as each viewer shops for the performance that is of greatest interest. For this reason advertisers prefer to have their advertisements positioned similarly across multiple web pages or channels within a provider site. Also because of this page hopping by viewers, the price value for one viewer for one steaming multi-media packet of a duration may be relatively small. However, the advertiser is assured a sufficient duration of view for comprehension for each viewer over multiple expositions. In a variation of this embodiment the site provider may at the scheduled time feature a catalog depicting multiple live expositions on a single page. From a live catalog the viewer may view many live samples before selecting the full screen version of a performance. In yet another variation of this embodiment, expositions are scheduled to perform at three different subsequent times. Viewer's preferences for expositions may be logged and registered to allow rapid selection of only those items of interest during subsequent sessions. After each performance those expositions that have earned the most compensation advance to the next scheduled time slot. Some submitting musicians enlist their friends and relatives to attempt to influence the metering mechanism results in their favor by loading the viewing audience for their musical exposition. By the second round of this three-round variation of this performance embodiment, the selection of thousands of viewers will easily overwhelm any possible solicited audience. By the end of the third round of performances, the best of the musicians will have received thousands of dollars of compensation and a degree of recognition otherwise impossible to achieve as an amateur.

BRIEF DESCRIPTION OF THE DRAWINGS

FIG. 7 is an instantaneous example of a metering and compensation calculation spreadsheet for an individual submitter.

FIG. 8 is an instantaneous example of a metering and billing calculation spreadsheet for a single funding source.

DETAILED DESCRIPTION OF THE DRAWINGS

Figure 1:
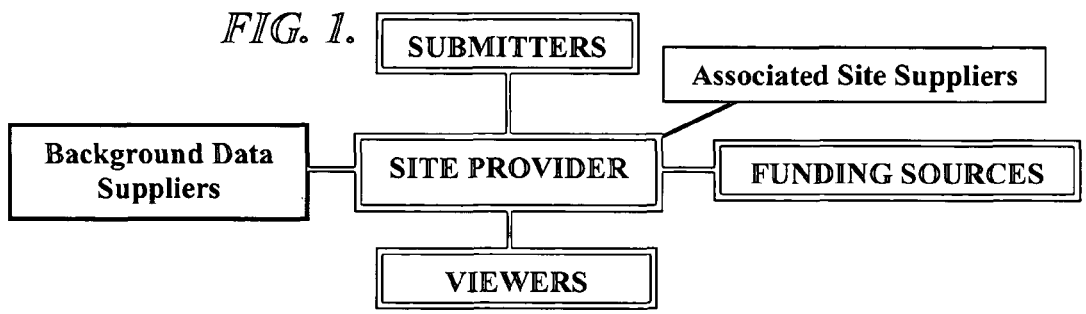
FIG. 1 is a diagram of the relationship of the independent entities within an embodiment of the present invention.

FIG. 1 shows the independent entities of the internet news compensation system. The provider site is the central operating entity of the internet news compensation system. The provider site is the gatekeeper for the material that is hosted on the site. The provider site also provides indexing, catalog hosting, tracking, metering, compensation accounting, billing, communication services, and multi-media hosting. The submitters supply the multi-media expositions that are the basis of the products that are hosted. The viewers select among the available products. The finding sources provide the financial fuel for the process. Background data suppliers may be either commercial or free sites that supply information selected to broaden the aspects of a multi-media exposition. Even though these are independent entities the teaching of this current invention is that the submitters, the funding sources, the viewers, the background data suppliers and the associated site suppliers all communicate and interact in real time with the site provider as dictated by the site provider.

Figure 2:
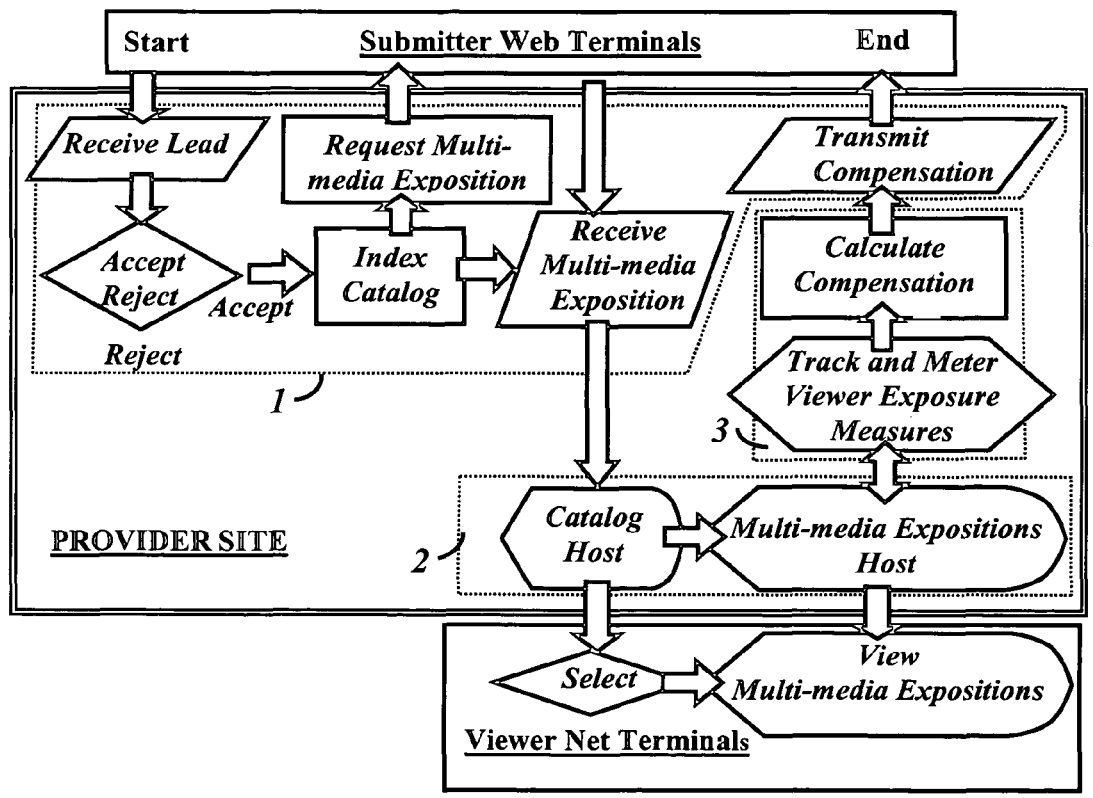
FIG. 2 is a flow diagram of an embodiment of the current invention.

FIG. 2 shows that for this embodiment there are three entities that operate within the internet environment. The process flow starts as indicated with a transmission of a lead from a submitter web terminal to the provider site. Upon receipt of the lead by the provider site the provider site either accepts or rejects the lead. The criteria for acceptance or rejection may be due to the subject matter or the location of the submitter designated in the lead being incompatible with the offering goals of the provider site. For example a breaking news site would reject a human-interest subject, or a car accident in a Canadian location would be outside the audience coverage of a California site provider. With acceptance of the lead, the lead is indexed and cataloged and a request for the multi-media exposition is sent to the submitter web terminal. The index process may assign or use a unique designator to the exposition. The index process may also use an inherently unique designator within the lead such as a cell phone number or a web address. The submitter web terminal responds to the approval and request for the exposition by initiation of broadband data transmission by the internet to the provider site. The provider site receives the data comprising a multi-media exposition. Process steps shown in the dotted block number 1 comprise the activities of the submitter web server. After receipt of the multi-media exposition, the catalog is hosted for download, display, and item selection by viewer web terminals. The catalog host shares a direct link for continuous electronic communication with the Multi-media Expositions Host. These two process steps shown in the dotted block number 2 comprise the activities of the viewer web server. A selection of an item by a viewer web terminal from the catalog triggers the download and direct viewing of the selected multi-media exposition from the group of multi-media expositions hosted on the provider site. The selection and its subsequent download initiates tracking of the multi-media exposition based upon its prior index. The viewing is then metered based upon one or more viewer exposure measures. The metering information is used as the basis for calculating compensation, which is transmitted to the submitter web terminal. The process steps shown in the dotted block number 3 comprise the activities of the computerized metering mechanism. This transmission of the compensation ends the provider site process, but the process is iterative and is updated continuously during the multi-media exposition transmitted by the submitter web terminal.

Figure 3:
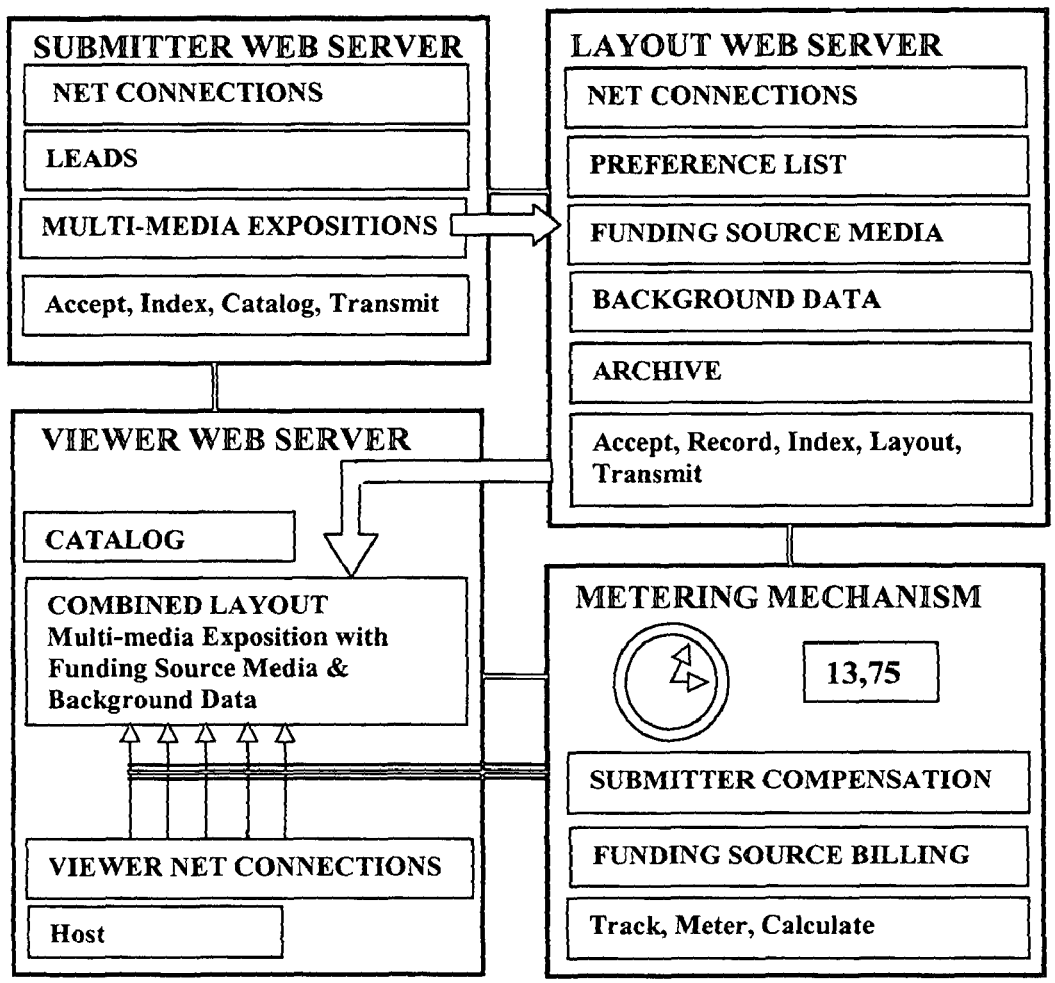
FIG. 3 is a schematic of the components of an embodiment of the current invention.

FIG. 3 shows product flow between the four major components comprising the provider site of the current invention and their internal elements. Each of the four major components is electronically connected to and in real time communication with all other components as indicated by the four short connecting lines. The large arrows indicate the flow of the multi-media expositions. The submitter server is comprised of web connections, leads, and multi-media expositions. The multi-media expositions are accepted, indexed, and cataloged according to information provided in each lead. The layout web server comprises web connections, funding source preference lists, funding source media, and background data, which are accepted, indexed, and combined with the multi-media expositions into a layout. Background data may be requested by the submitter or supplied independently by the site provider to strengthen a weak exposition with low viewer measures, or amplify an exposition of some important event. The layout server records the multi-media expositions into an archive. The archive is available for sale to other media such as television. The archive may also be used by an automated gatekeeper to prevent the use in an exposition of a previously recorded exposition or copyrighted material. The layout of the finding source media on the multi-media expositions is dictated by the preferences. The combined layout is then transmitted to the viewer server. The viewer web server hosts a multitude of viewer web connections and a catalog for online display. The viewers select from the multitude of multi-media expositions listed in the catalog. The five upward arrows illustrate the viewers' selection choices. The lines intersecting the viewer arrows indicate the interception, monitoring, and metering of the viewers by the metering mechanism. The metering mechanism tracks and meters the viewers as represented by the clock illustrating the time, date, and duration of view, and the counter illustrating the number of viewers, which shows that 13,751 viewers have downloaded and observed a particular multi-media exposition. The metering mechanism utilizes metering data to calculate both submitter compensation and funding source billing in real time.

Figure 4:
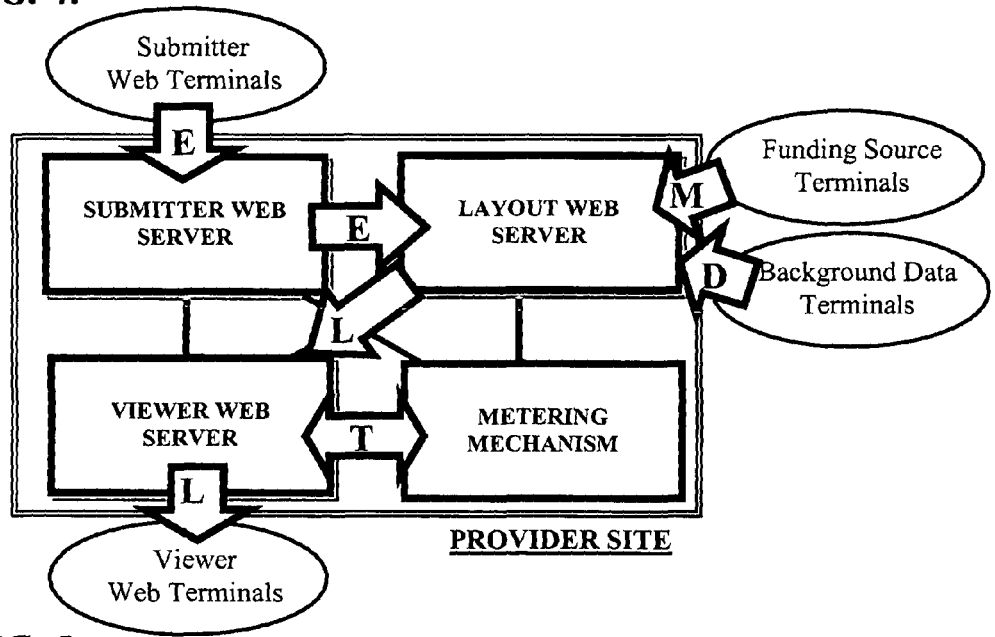
FIG. 4 is a flow diagram of the media and multi-media of an embodiment of the current invention.

FIG. 4 shows the flow of the multi-media and media from the submitter web terminals to the viewer web terminals. The arrows with an "E" represent the flow of the multi-media expositions through the system. The expositions enter the system from submitter web terminals and are uploaded to the submitter web server. The expositions are then transmitted to the layout web server, whereby the funding source media "M" are transmitted to the layout web server by funding source terminals. Further, background data terminals transmit background data "D" to the layout web server. The funding source media and background data items are matched to each multi-media exposition based on subject matter and funding source preferences, thereby forming completed layouts "L". The completed layouts "L" are then transmitted to the viewer web server and further to the viewer web terminals. The computerized metering mechanism receives and transmits tracking data "T" from and to the viewer web server. The short lines indicate the electronic connections between major elements.

Although separate computer servers and mechanisms are described as components of the provider site, substantially all the servers, metering mechanisms, calculation mechanisms, and internet communication devices described within the provider site may be incorporated into a single computer web server hardware unit.

Figure 5:
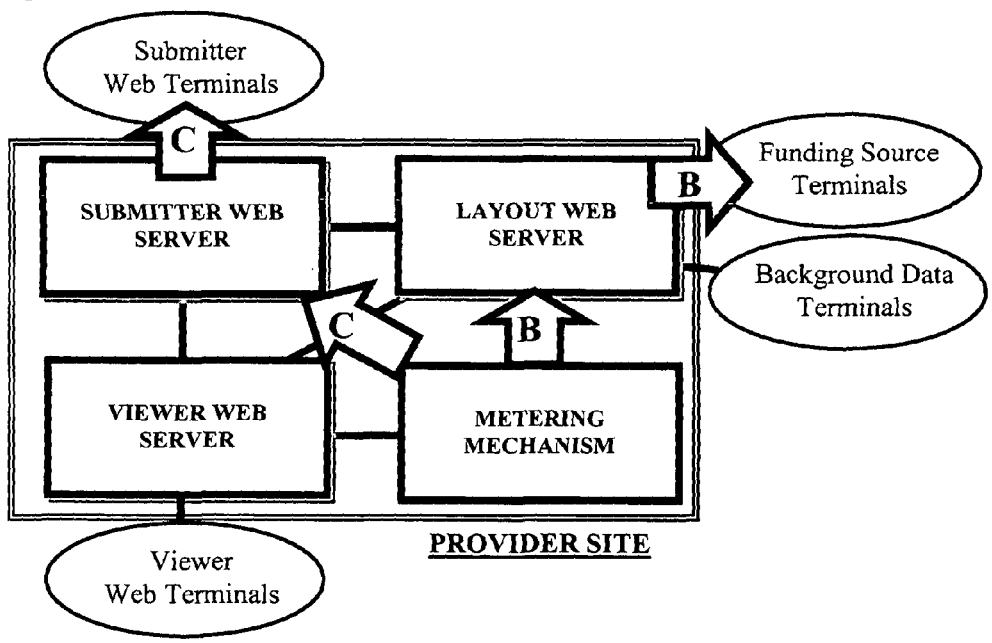
FIG. 5 is a monetary data flow diagram of an embodiment of the current invention.

FIG. 5 shows the monetary data flow communicating submitter compensation "C" and funding source expense billing "B". The metering mechanism calculates submitter compensation and transmits the compensation "C" to the submitter web server, whereby the compensation "C" is further transmitted to submitter web terminals. Additionally, the metering mechanism calculates funding source expense billing "B" and transmits the expense billing "B" to the layout web server, whereby the expense billing "B" is further transmitted to funding source terminals.

Figure 6:
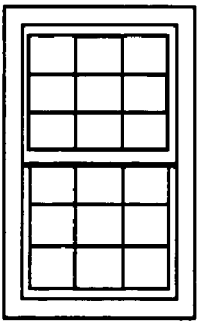
FIG. 6 is an example of a funding source preference list with finding source media items.

FIG. 6 shows the structure that assigns price values to preference categories and preference groups. Three viewer exposure measures are indicated by a double asterisk: exposure per viewer, click through, and address capture. The example is for a funding source called XYZ Windows, Inc. The preference list for this example company is listed in three columns. The funding source media item in this example is a window advertisement. It is shown at the bottom of the spreadsheet. The funding source preference categories are comprised of subject of the exposition, geographic coverage, time of day, layout placement of the media item on the screen, and viewer response. The preference groups for the preference categories are listed in the center column. A price value per viewer is assigned individually by group within each preference category in the right column. For example, if the layout places the funding source media item as a marquee, the media item will scroll across the bottom of the screen during the multi-media exposition. As a funding source media item is displayed to viewers with each preference-matched multi-media exposition, then the price value for that preference is applied for compensation calculation. In this example the Marquee layout will cost the funding source $0.05 for each metered viewer. Price values are generally set competitively within an industry. Various auction and reverse auction methods may be used by the site provider for the establishment of preference price values with funding sources.

FIG. 7 shows an application of the cost structure for a single submitter of a single exposition. The costs shown are an instantaneous snapshot, however the exposition is ongoing and live. Thus, for this example, the costs are assumed to continue to accrue after this snapshot until the exposition is terminated. The submitter is identified with initials, A. J. P. The lead information submitted by the individual submitter is designated with an asterisk. The example shows the data items in the lead to be the submitter's name, web address, GPS location, credit card number, the subject of the exposition, and the coverage, in this case "Dallas Local." The second line shows the unique exposition index number, 12,175 that has been assigned by the site provider upon approval of the lead. The calculation spreadsheet includes the date, the time the lead was approved, the current time, funding source preferences, funding source preference price values for each group, and the cumulative number of metered viewers. During the approximately fifty minute exposition 3747 viewers have, thus far, been metered. Note that the time is current based on the continuing live transmission of the exposition. The funding source expense of $1,236.51 is calculated based upon the viewer exposure measure of price value per metered viewer. The group price values are based on the preferences of FIG. 6. The compensation percentage split is predetermined by the provider base upon market conditions. In this example the split between the site provider and the individual submitter is fifty percent each or $618.26.

FIG. 8 shows an example of an instantaneous snapshot of a metering and billing calculation spreadsheet for a single funding source, XYZ Windows, Inc. Four discrete expositions indexed by their exposition index numbers for two sequential days are shown. Four preference groups from FIG. 6 for this particular funding source are applied to the four expositions. This spreadsheet shows that no viewers chose either a click though or and address capture response since these two preferences are omitted. Thus, in this case the viewer exposure measure is the cumulative number of viewers. For each exposition the billing calculation spreadsheet shows the current date and time, individual exposition index numbers, funding source preferences and price values, and number of metered viewers. The funding source expense per exposition is calculated based upon price values per metered viewer. The total expense to the funding source is the sum of the expenses accruing to the four expositions that exposed viewers to the funding source media. This exposure took the form of banner, sidebar, and marquee placements on the exposition layout. The exposure was constant for all four expositions. Note that the first two expositions 12,175 and 12,124 are still live and in progress, while the submitters 11,832 and 11,854 were concluded the previous day and these latter totals are complete. If all the expositions were to be completed in this instant, the spreadsheet indicates that the funding source will be billed for $4,860.59 for exposure to 12,399 total viewers (3747+2168+4794+1690).

FIG. 8 also illustrates the potential variability in earnings between the four expositions. It shows the difficulty of predicting the earning potential of a particular multi-media exposition. A fixed compensation schedule for multi-media expositions is financially hazardous when so many viewer interest uncertainties and price value combinations coexist. These uncertainties alone are indicators for a value added structure for site providers after the teaching of the current invention. Residual rights to recordings of momentous events captured from multi-media expositions and stored in archive further reinforce a value added structure for site providers.

Definitions

For the purposes of the embodiments of the current invention the following definitions apply.

A web server is a computer connected to the internet or world wide web and to other computers possessing software programs and hardware accessories that make it autonomous for continuously receiving, compiling, sorting, and transmitting digital broadband data from multiple sites. Examples are mainframe or PC computer servers.

A submitter web server is the gatekeeper to the provider site. It approves or rejects the lead from submitters and authorizes submittal transmission. This gatekeeper function may be reinforced with learning programs and artificial intelligence algorithms. Multi-media comprises a combination of audio and visual images. Many computers, PDAs, and cell phones may be capable of only capturing and transmitting a series or sequence of still pictures. When accompanied by live commentary these staggered snapshots constitute multi-media.

An independent submitter is an individual or group who voluntarily offers to submit an exposition to a host internet site in exchange for compensation.

The term voluntary means without influence on an individual except for the incentive of compensation.

A web terminal is an electronic device capable of image capture, internet multi-media transmission, internet reception, and information display. Examples of a web terminal include microprocessor driven transmission equipment and camera equipment multi-media capable such as a personal computer, laptop, palm top, PDA, internet television set-top box, camera cell phone, satellite phone, digital communication camcorder, etc.

A free agent viewer is an individual with a multiplicity of options for internet media selection, downloading, and viewing by use of a web terminal.

A viewer web server is a computer that is capable of transmitting multiple multi-media streams for multi-cast to multiple internet viewer web terminals.

A metering mechanism is an autonomous software application installed and running on a web server or other internet or local area network connected computer utilized as a system component of the provider site with programmed capabilities for data tracking, monitoring, calculation, and communication.

A viewer exposure measure is the criteria by which a provider determines the availability of a multi-media stream to a single viewer. Examples of a viewer exposure measure comprise number of viewers, individual duration of view, average duration of view, individual viewer feedback or response, and average viewer feedback, viewer response or any combination.

Compensation is the monetary amount awarded for an offered, accepted, submitted, and multicast exposition. Compensation is subject to adjustment prior to payment for taxes, etc.

Payment is the actual monetary earnings paid to an independent submitter in the form of, but not limited to, direct deposit to a bank account, a credit to a credit card account, or an electronic credit to an individual account with a service provider (cell phone account, internet account, ISP account, etc.)

Multicast is the transmission of a single broadband data stream to multiple viewer web terminals in real time.

A site provider is an individual, corporation, or agency, either for-profit or not-for-profit, that has planned, organized and implemented an internet site to service the general public.

A provider site is an internet site with multiple pages and multiple multi-media streams implemented to provide news and information.

A download is a packet or stream of data requested by and transferred to a web terminal or server from another web server or web terminal.

Indexing means providing a unique identity and data position within a database of similar items. Indexing treats all associated data from an individual as an object.

Tracking is the maintenance of identity, record of location, and record of use of a data item as it is received, transmitted, stored, and viewed through a plurality of hardware and software data processing entities.

A preference list is the criteria stipulated by a funding source for the use of that funding source media item by the provider site. A preference list comprises association preferences, layout preferences, and price values.

Association preferences are the criteria for association of funding source media with an exposition and the price value for the satisfaction of those criteria. Examples of association preferences comprise subject, location, or time of day or any combination thereof.

Layout preferences are the criteria for layout and presentation of funding source media integral with an exposition screen and the price value for the satisfaction of those criteria. Examples of layout preference criteria comprise banner ads, sidebar video, and ticker tapes.

Price value is the monetary amount offered to be paid by a funding source for the performance of a service specified in general terms by a preference, preference category, or preference group.

What is claimed and worthy of a Letter Patent is:

1. An internet news compensation system, comprising:
   a submitter web server to accept and index a multi-media exposition;
   an independent submitter web terminal to submit and update the multi-media exposition by an independent submitter;
   a viewer web server to display the multi-media exposition on a provider site to a free agent viewer utilizing a viewer web terminal; and
   a metering mechanism, comprising:
      a tracker to track the multi-media exposition upon selection by the free agent viewer for display;
      a calculator to calculate compensation accruing to the independent submitter based on at least one selected viewer exposure measure accruing to the submitted multi-media exposition; and
      an updater/communicator to update the compensation and communicate the updated compensation to the submitter web terminal;
   where the submitter web server, the independent submitter web terminal, the viewer web server, and the metering mechanism are all in continuous real time electronic communication among each other, and
   where the compensation due the independent submitter is disposed for continuous real time communication to the independent submitter web terminal during the continuous real time electronic communication of the multi-media exposition by the submitter web terminal.

2. The internet news compensation system of claim 1, where the viewer exposure measure is chosen from a measure of a number of viewers, a measure of a duration of view of the free agent viewer, a measure of a free agent viewer response, a measure of free agent viewer click through to a linked site, and all possible measure combinations thereof.

3. The internet news compensation system of claim 1, where the viewer web server is in real time communication with associated internet sites of viewing availability of the multi-media exposition.

4. The internet news compensation system of claim 1, where the submitter web server accepts and indexes the multi-media exposition based upon a lead of the multi-media exposition.

5. The internet news compensation system of claim 1, further comprising a layout web server to accept and index funding source media item from a funding source web terminal.

6. The internet news compensation system of claim 5, where the layout web server accepts and records the multi-media exposition in an archive.

7. The internet news compensation system of claim 4, where the submitter web server identifies, interprets, sorts, ranks, and segregates the multi-media exposition into a group within a catalog, based upon preselected criteria applied to the lead, and where the viewer web server displays multi-media exposition groups and the multi-media exposition catalog on an internet site to the free agent viewer.

8. The internet news compensation system of claim 5, where the layout web server retrieves, accepts, and indexes a background media item from at least one of a web server and a terminal.

9. The internet news compensation system of claim 5, where the layout web server accepts and indexes the funding source media item based upon a preference list of the funding source media item.

10. The internet news compensation system of claim 9, where the layout web server positions the funding source media item in close proximity to the multi-media exposition of a related catalog group based upon the preference list of the funding source media item.

11. The internet news compensation system of claim 9, where the preference list further comprises a price value of each preference item.

12. The internet news compensation system of claim 11, further comprising a calculator to calculate expense accruing to the funding source media item based on at least one instance of the price value and at least one instance of the viewer exposure measure.

13. The internet news compensation system of claim 12, where the calculator to calculate compensation accruing to the independent submitter further calculates based upon a portion of a sum of expenses accruing to the funding source media item for the multi-media exposition of the independent submitter.

14. The internet news compensation system of claim 1, where a beginning of a submission of the multi-media exposition by the independent submitter is unscheduled by the provider site.

15. The Internet news compensation system of claim 1, where a beginning of a submission of the multi-media exposition by the independent submitter is scheduled at a day and time mutually preselected by the independent submitter and the provider site.

16. The internet news compensation system of claim 14, where the independent submitter comprises a reporter, further the multi-media exposition is an unscheduled news and information report,
further a site provider comprises a news collection and dissemination agency,
further the provider site comprises a news and information internet site controlled and operated by the site provider,
further the lead comprises a subject, an identity, a location, and a payment account,
further a funding source comprises an advertising agency,
further the funding source media item comprises an advertisement,
further the metering mechanism comprises at least one of a measurer to measure a number of viewers, a report time determiner to determine a time of day of the news and information report downloaded from the provider site by the free agent viewer, and a duration time determiner to determine a time of day of a duration of view of the news and information report downloaded from the provider site by the free agent viewer, where the metering mechanism calculator utilizes the measurements and determinations to provide for compensation determination for the reporter further where the metering mechanism communicates the compensation to the reporter as the reporter continues submission of the news and information report.

17. The internet news compensation system of claim 15, where the independent submitter comprises an instructor,
further the multi-media exposition is an instruction class,
further the provider site comprises an internet site controlled and operated by the provider,
further the lead comprises a subject, an identity, a location, and a payment account.

* * * * *